United States Patent
Huh et al.

(10) Patent No.: US 9,533,581 B2
(45) Date of Patent: Jan. 3, 2017

(54) METHOD FOR DETERMINING AMOUNT OF REGENERATIVE BRAKING

(71) Applicants: Hyundai Motor Company, Seoul (KR); Kia Motors Corporation, Seoul (KR)

(72) Inventors: Jee Wook Huh, Gyeonggi-do (KR); Sang Joon Kim, Seoul (KR); Gwang Il Du, Incheon (KR); Teh Hwan Cho, Gyeonggi-do (KR); Woo Suk Choi, Gyeonggi-do (KR); Kyoung Cheol Oh, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/868,654

(22) Filed: Sep. 29, 2015

(65) Prior Publication Data
US 2016/0129791 A1    May 12, 2016

(30) Foreign Application Priority Data

Nov. 12, 2014 (KR) .......................... 10-2014-0156847

(51) Int. Cl.
*B60L 7/26* (2006.01)
*B60L 7/22* (2006.01)
*B60L 7/14* (2006.01)

(52) U.S. Cl.
CPC .............. *B60L 7/26* (2013.01); *B60L 2240/12* (2013.01); *B60L 2240/421* (2013.01); *B60L 2240/423* (2013.01); *B60L 2240/486* (2013.01); *B60L 2240/54* (2013.01)

(58) Field of Classification Search
CPC ................. B60L 7/26; B60L 7/06; B60L 7/22; B60L 7/14; B60T 8/4081; B60T 8/26; B60K 6/22

USPC ...... 701/70; 477/3; 303/9.63, 151, 155, 152, 303/114.1; 318/376
See application file for complete search history.

(56) References Cited

U.S. PATENT DOCUMENTS

| | | | | |
|---|---|---|---|---|
| 6,231,134 | B1* | 5/2001 | Fukasawa | B60L 7/26 303/152 |
| 6,412,882 | B1* | 7/2002 | Isono | B60K 6/22 303/11 |
| 2001/0039230 | A1* | 11/2001 | Severinsky | B60H 1/004 477/3 |
| 2004/0108771 | A1* | 6/2004 | Tsunehara | B60L 7/22 303/155 |

(Continued)

FOREIGN PATENT DOCUMENTS

| | | |
|---|---|---|
| JP | 1995-250402 A | 9/1995 |
| JP | 1997-308004 A | 11/1997 |

(Continued)

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A method for determining an amount of regenerative braking includes: determining a possible amount of regenerative braking at a time of braking a vehicle; distributing a first amount of regenerative braking up to the possible amount of regenerative braking as the amount of regenerative braking; distributing a second amount of regenerative braking remaining from the possible amount of regenerative braking as an amount of hydraulic braking; and performing, first, regenerative braking by issuing a motor torque instruction according to the possible amount of regenerative braking and, second, friction braking using the amount of hydraulic braking.

8 Claims, 9 Drawing Sheets

(56) References Cited

U.S. PATENT DOCUMENTS

| | | | |
|---|---|---|---|
| 2006/0066146 A1* | 3/2006 | Otomo | B60T 8/26 |
| | | | 303/151 |
| 2010/0076657 A1 | 3/2010 | Jinno et al. | |
| 2011/0118920 A1 | 5/2011 | Kim | |
| 2012/0056470 A1 | 3/2012 | Kim | |
| 2012/0235469 A1* | 9/2012 | Miyazaki | B60T 8/4081 |
| | | | 303/9.63 |
| 2014/0172211 A1 | 6/2014 | Kim | |
| 2015/0258897 A1* | 9/2015 | Okada | B60L 7/14 |
| | | | 318/376 |

FOREIGN PATENT DOCUMENTS

| | | |
|---|---|---|
| JP | 2002-095108 A | 3/2002 |
| JP | 2010-074886 A | 4/2010 |
| KR | 2002-0054800 A | 7/2002 |
| KR | 10-0829306 B1 | 5/2008 |
| KR | 10-0836039 B1 | 6/2008 |
| KR | 10-2009-0131734 A | 12/2009 |
| KR | 10-2010-0061208 A | 6/2010 |
| KR | 10-1404087 B1 | 6/2014 |
| WO | 2011/016095 A1 | 2/2011 |
| WO | 2014/103503 A1 | 7/2014 |

\* cited by examiner

METHOD FOR DETERMINING AMOUNT OF REGENERATIVE BRAKING

CROSS-REFERENCE TO RELATED APPLICATION

This application claims under 35 U.S.C. §119(a) priority to and the benefit of Korean Patent Application No. 10-2014-0156847 filed on Nov. 12, 2014, the entire contents of which are incorporated herein by reference.

BACKGROUND (a) Technical Field

The present disclosure relates generally to a method for determining an amount of regenerative braking. More particularly, it relates to a method for determining an amount of regenerative braking to maximize the amount of regenerative braking by making an early stage control of the regenerative braking be performed at an early stage of braking.

(b) Background Art

The travelling modes of hybrid vehicles include an Electric Vehicle (EV) mode which is a pure electric vehicle mode using only a motor power, a Hybrid Electric Vehicle (HEV) mode which utilizes an engine as the primary power source and a motor as auxiliary power, and a Regenerative Braking (RB) mode which charges a battery by recovering brake and inertial energy of the vehicle while travelling due to braking or inertia of the vehicle.

With respect to the latter, regenerative braking is a technology which generates electric energy using a motor, stores generated electric energy using a high voltage battery, and reuses the electric energy at the time of driving the vehicle by applying an inverse torque to the electric motor using energy generated during braking in order to maximize the vehicle's fuel ratio. Regenerative braking technology has been applied to most environment friendly vehicles, such as hybrid cars, electric cars, fuel cell cars, and the like. In the case of hybrid cars, regenerative braking plays a large role in fuel ratio improvement to such an extent that the regenerative braking is the primary driver for fuel ratio improvement in comparison to a general vehicle.

Regenerative braking is typically performed through a coordinated control of an electric brake device (i.e., EBS: Electric Brake System) which takes charge of a hydraulic brake and a hybrid controller (i.e., HCU: Hybrid Control Unit) which is an upper level controller of the hybrid vehicle. In this regard, FIGS. 1 and 2 illustrate a conventional regenerative braking procedure performed through a coordinated control between the EBS and the HCU. As shown in FIGS. 1 and 2, the procedure of the coordinated control between the EBS and the HCU consists of steps of inputting a required amount of braking into the EBS as a driver presses a brake pedal, determining a permissible amount of regenerative braking by the EBS, determining an amount of execution of regenerative braking according to the permissible amount of regenerative braking by the HCU, determining an amount of friction braking by the EBS according to the amount of execution of regenerative braking determined by the HCU and performing a friction braking control, and performing a regenerative braking control by a motor controller (i.e., MCU: Motor Control Unit) according to the amount of execution of regenerative braking determined by the HCU.

However, since vehicle braking is in close relation to safety, the hydraulic braking (i.e., friction braking device) is deemed to have a priority over the regenerative braking in the above mentioned coordinated control. Furthermore a case may occur where the regenerative braking is limited due to reasons of motor temperature, a battery charge condition, a speed change procedure of a transmission, and the like.

Meanwhile, at the time of braking, in case of performing the hydraulic braking after first checking whether the regenerative braking is actuated without performing the hydraulic braking, since a brake delay time of at least 20 ms can be generated, there may be a risk of accidents. Therefore, since at the early stage of braking, the hydraulic braking of at least 1 bar is first performed, and thereafter the hydraulic control is performed by judging the necessity of the regenerative braking, there is a loss of the amount of regenerative braking as much as an amount of oil pressure. That is, a problem as follows may occur:

First, there is a problem of fuel ratio aggravation. The regenerative braking is a technology of converting energy into electric energy at the time of braking and is directly related to the fuel ratio, so that an increase in the amount of regenerative braking at once equates to fuel ratio improvement. However, since the hydraulic braking is first performed to secure the braking safety, i.e., since the hydraulic pressure is unconditionally first used at the time of early stage braking, fuel ratio aggravation due to the loss of the amount of regenerative braking is caused.

Second, there is a problem of aggravation of drive. At the early stage of braking, a control is performed in such a way that an oil pressure of at least 1 bar is applied. Thereafter, a total amount of braking of the regenerative braking and the hydraulic braking is made according to the amount of braking that a driver requires by reducing the oil pressure at the time of performing the regenerative braking. However, since the response of the regenerative braking is slow, there may occur a feeling of suddenness and discomfort at the initial stage of braking, and in the case of downward adjusting the increase gradient of the amount of regenerative braking to minimize the discomfort, eventually, a vicious circle of reducing the amount of regenerative braking and aggravating the fuel ratio is repeated.

The above information disclosed in this Background section is only for enhancement of understanding of the background of the disclosure and therefore it may contain information that does not form the related art that is already known in this country to a person of ordinary skill in the art.

SUMMARY OF THE DISCLOSURE

The disclosed embodiments have been made in an effort to solve the above-described problems associated with related art, and an object of the present disclosure is to provide a method for determining amount of regenerative braking which can change a conventional hydraulic braking priority control to a regenerative braking priority control, secure a braking stability by means of the hydraulic braking, and maximize the amount of regenerative braking, by outputting a reliable possible amount of regenerative braking to a hydraulic brake system by making the regenerative braking by an early stage control of regenerative braking be first performed at an early stage of braking.

According to embodiments of the present disclosure, a method for determining an amount of regenerative braking includes: determining a possible amount of regenerative braking at a time of braking a vehicle; distributing a first amount of regenerative braking up to the possible amount of regenerative braking as the amount of regenerative braking; distributing a second amount of regenerative braking remaining from the possible amount of regenerative braking as an amount of hydraulic braking; and performing, first, regenerative braking by issuing a motor torque instruction according to the possible amount of regenerative braking and, second, friction braking using the amount of hydraulic braking.

The determining of the possible amount of regenerative braking may include: calculating a chargeable motor power for a battery based on one or more of: a chargeable battery power, a battery load, a motor speed, and a motor chargeable torque, provided from a battery controller; operating the regenerative braking based on a vehicle speed; and multiplying the regenerative braking by a transmission gear ratio.

The possible amount of regenerative braking may be determined to be zero when encountering a regenerative braking limitation.

The regenerative braking limitation may include one or more of: a speed change lever being set to a sports mode, an N-step, a P-step, or an R-step, a lift-foot-up (LFU) state or a speed change occurring immediately before stopping, and a speed change pattern being changed when the vehicle is climbing.

The method may further include: when determining the possible amount of regenerative braking during a speed change, determining whether a condition of a motor of the vehicle corresponds to a steady torque mode, a steady power mode, or a mode conversion during the speed change.

The possible amount of regenerative braking ($Regen_{SteadyTorque}$) during the speed change in the steady torque mode condition of the motor may be determined by: i) obtaining a value $\alpha$ by dividing a gear ratio difference ($GR_{Diff}$) before and after the speed change by a speed change time ($\Delta T_{shift}$), ii) obtaining a calculated gear ratio ($GR_{cal-SteadyTorque}$) by adding a value obtained by integrating the value $\alpha$ in time and a before speed change step gear ratio ($GR_{before}$), and iii) multiplying the calculated gear ratio ($GR_{cal-SteadyTorque}$) by a motor torque ($T_{MOTOR}$).

The possible amount of regenerative braking ($Regen_{SteadyPower}$) during the speed change in the steady power mode condition of the motor may be determined by: i) obtaining a calculated gear ratio ($GR_{cal-SteadyTorque}$) by dividing a transmission input shaft speed ($\omega_{Tmin}$) by a transmission output shaft speed ($\omega_{TmOut}$), and ii) multiplying the calculated gear ratio ($GR_{cal-SteadyTorque}$) by a motor torque ($T_{MOTOR}$).

The possible amount of regenerative braking ($Regen_{MotorChange}$) during the speed change in the mode conversion of the motor may be determined by: i) obtaining the calculated gear ratio ($GR_{cal-ModeChange}$) by integrating, at a time of the speed change, a gradient ($\gamma$) obtained by adding the increase-decrease gradient $\alpha$ of the gear ratio in a steady torque region of the motor and an increase-decrease gradient $\beta$ of the gear ratio in a steady power region of the motor, ii) adding a virtual motor torque ($T_{motor-virtual}$) to the calculated gear ratio ($GR_{cal-ModeChange}$), and iii) adding a step gear ratio ($GR_{before}$) before the speed change to the gradient ($\gamma$).

The above and other features of the disclosure are discussed infra.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

Figure 1:
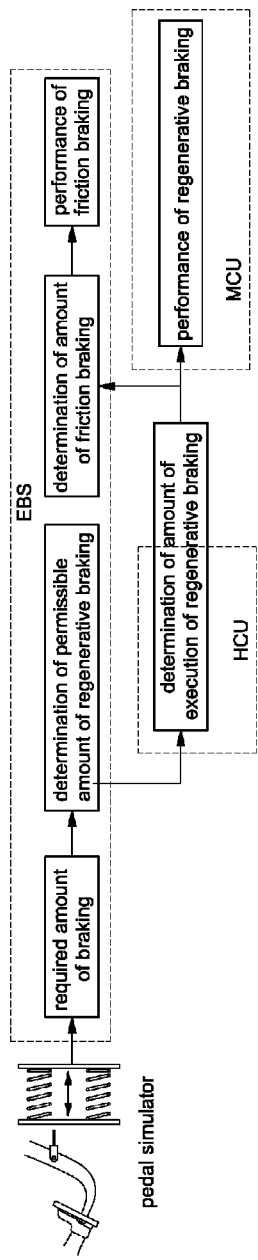
FIGS. 1 and 2 are control flow diagrams illustrating a conventional regenerative braking procedure performed through a coordinated control between EBS and HCU.
Figure 2:
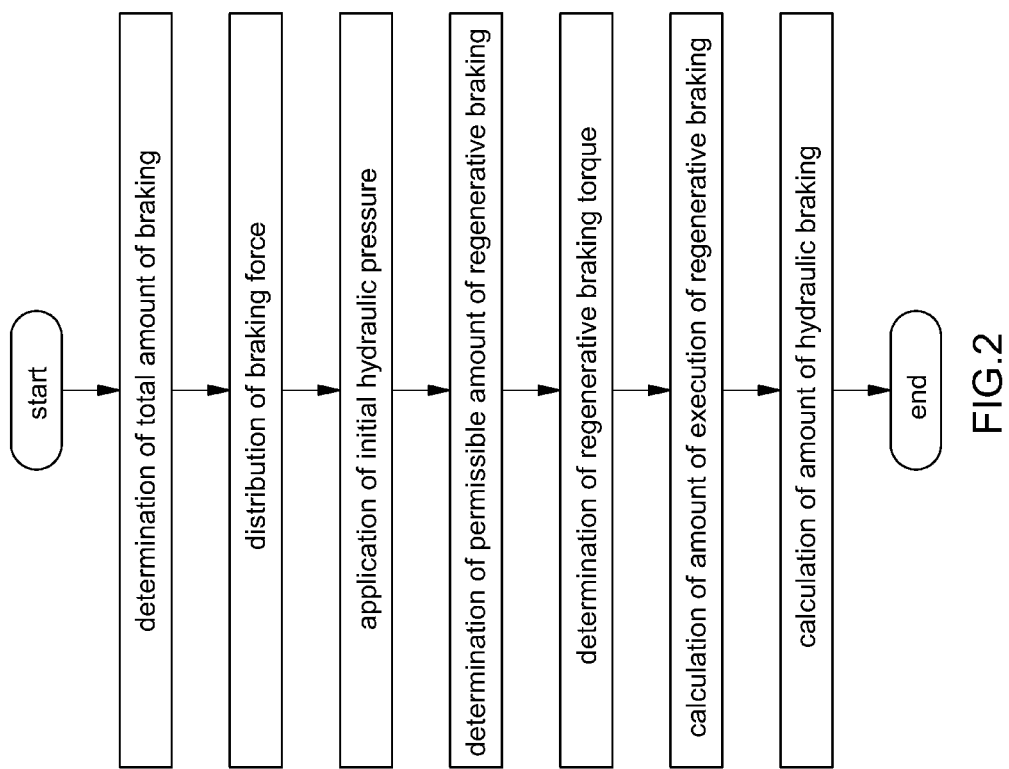

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION OF THE EMBODIMENTS

Hereinafter reference will now be made in detail to embodiments of the present disclosure, examples of which are illustrated in the accompanying drawings and described below. While the disclosure will be described in conjunction with embodiments, it will be understood that present description is not intended to limit the disclosure to those embodiments. On the contrary, the disclosure is intended to cover not only the disclosed embodiments, but also various alternatives, modifications, equivalents and other embodiments, which may be included within the spirit and scope of the disclosure as defined by the appended claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Referring now to the disclosed embodiments, the present disclosure is intended to provide a coordinated control method for the regenerative braking of an environment friendly vehicle, and not only the coordinated control between a hybrid controller (i.e., HCU: Hybrid Control Unit) which is a highest level controller and an electric brake device (i.e., EBS: Electric Brake System) which is a brake controller, but also a battery manager (i.e., BMS: Battery Management System) which is a battery controller, a transmission controller (i.e., TCU: Transmission Control Unit) which is a transmission controller, and a motor controller (i.e., MCU: Motor Control Unit) which is a motor controller, etc., are involved in brake control. In addition, the EBS may be replaced with the Active Hydraulic Booster (AHB) which is an active hydraulic booster having an identical control function.

Figure 3:
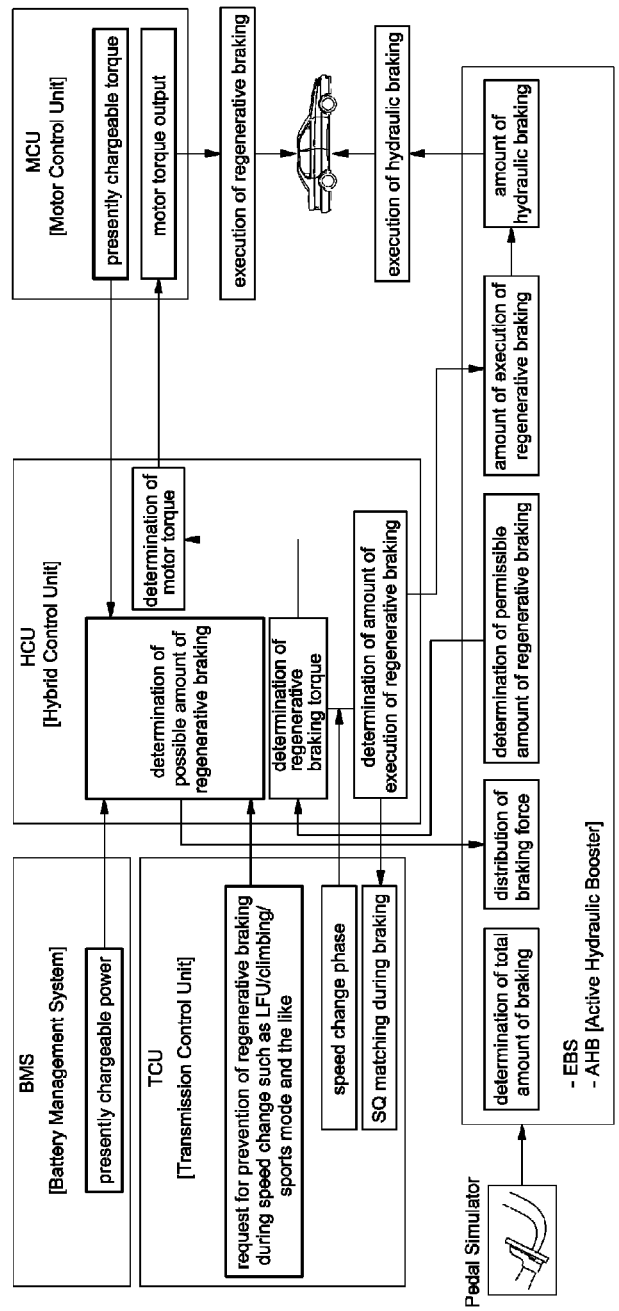
FIG. 3 is a control flow diagram illustrating a coordinated control method for the regenerative braking of an environment friendly vehicle according to the present disclosure.
Figure 4:
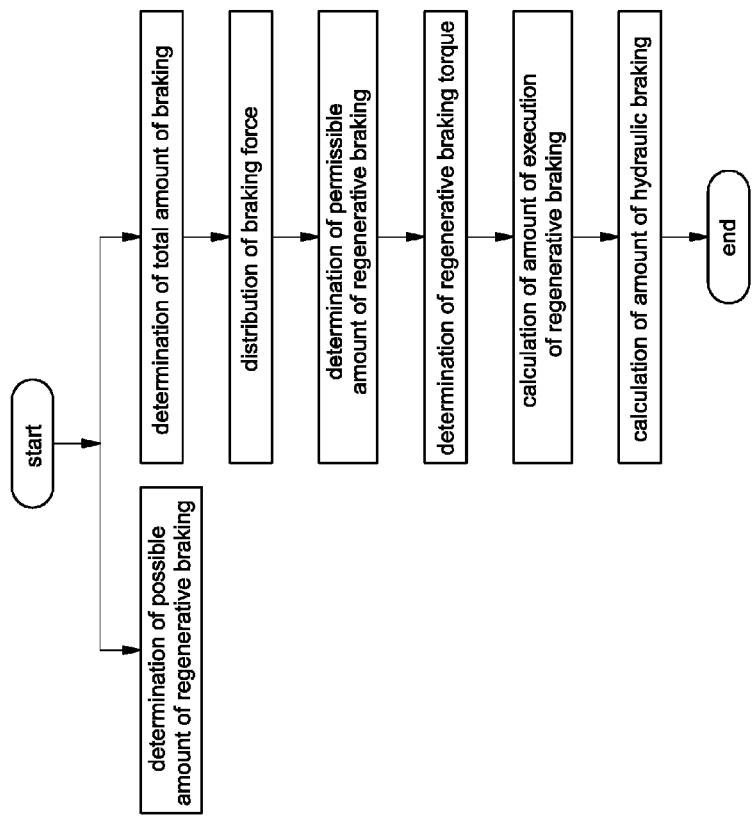
FIG. 4 is a flow chart showing the coordinated control method for the regenerative braking of an environment friendly vehicle according to the present disclosure.

Accompanying FIG. 3 is a control block diagram illustrating a coordinated control for the regenerative braking according to the present disclosure, and FIG. 4 is a flow chart showing the coordinated control method for the regenerative braking of an environment friendly vehicle according to the present disclosure. As shown in FIG. 3, the EBS which is the brake controller and the HCU which is a hybrid controller perform a hydraulic brake control and a regenerative braking control through the coordinated control at the time of braking the environment friendly vehicle. At this time, the BMS (i.e., battery controller) may input a present chargeable power and the like for determination of a possible amount of regenerative braking, the TCU (i.e., transmission controller) may input a request for inhibition of regenerative braking during a speed change, and the MCU (i.e., motor controller) may control a motor torque for the regenerative braking according to an amount of execution of regenerative braking.

In this regard, first, when a required amount of braking is input as a driver presses a brake pedal, the EBS determines a total amount of brake and determines a permissible amount of regenerative braking among the total amount of brake. When the permissible amount of regenerative braking determined by the EBS is input to the HCU, the HCU performs an operation of determining the amount of execution of regenerative braking.

Next, when the amount of execution of regenerative braking determined by the HCU is input to the EBS again, the EBS determines an amount of hydraulic braking (i.e., an amount of friction braking), and performs a friction braking control by a hydraulic pressure. In addition, when the HCU determines a regenerative braking torque based on the permissible amount of regenerative braking determined by the EBS, determines a motor torque which suits the regenerative braking torque, and sends the motor torque to the MCU, the MCU controls the motor torque so that the regenerative braking is performed.

According to the present disclosure, the HCU determines an immediately executable possible amount of regenerative braking in consideration of a speed change condition, an amount of battery charge, a motor condition, a current travel height, climbing angle and the like and sends it to the EBS, then the EBS performs a brake force distribution control which distributes the amount of regenerative braking and the amount of friction braking referring to the possible amount of regenerative braking. At this time, the HCU operates a practicable amount of regenerative braking, i.e., the possible amount of regenerative braking under a present vehicle condition, and sends it to the EBS, so that the EBS may rely on the possible amount of regenerative braking. Therefore, when the EBS performs the brake force distribution control, the EBS distributes an amount as much as the possible amount of regenerative braking sent from the HCU as the amount of regenerative braking, and distributes the remaining as the amount of hydraulic braking. At the same time, the HCU issues a motor torque instruction to the MCU according to the possible amount of regenerative braking, so that the regenerative braking is first performed, and the EBS performs the friction braking with the amount of hydraulic braking which is obtained by subtracting the amount of regenerative braking which is as large as the possible amount of regenerative braking sent from the HCU from the total amount of braking.

Conventionally, since it cannot be reliably estimated how much the regenerative braking is possible in real time, the hydraulic braking must be first performed; however, in the present disclosure, since the possible amount of regenerative braking can be precisely estimated in consideration of the speed change condition, the amount of battery charge, the motor condition, the current travel height, climbing angle and the like of the current vehicle, an early stage control of regenerative braking is possible based on the accurately estimated possible amount of regenerative braking. As such, since the early stage control of regenerative braking is possible at the initial stage of braking, by making the regenerative braking be first performed prior to the hydraulic braking in the initial stage of braking, an energy recovery increase and a fuel ratio improvement may be sought through a maximization of the amount of regenerative braking and a braking feeling at the initial stage of braking may be improved.

Hereafter, a method of estimating the possible amount of regenerative braking for the early stage control of regenerative braking is explained.

Figure 5:
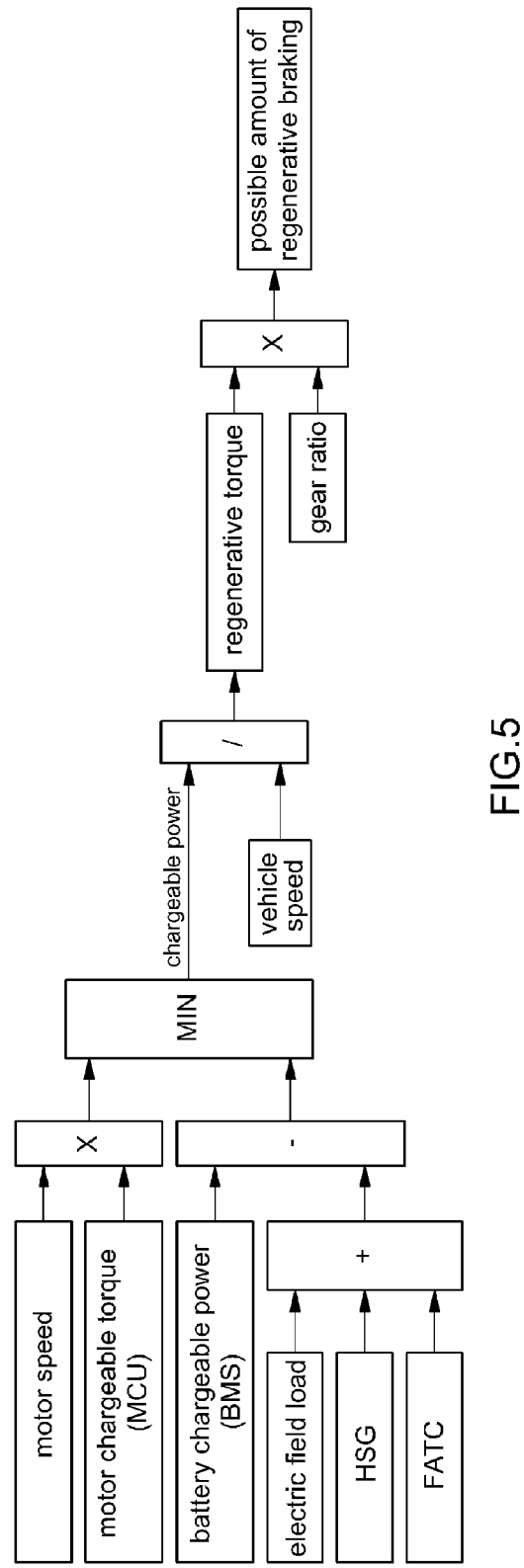
FIG. 5 is a control flow diagram showing a method of operating an possible amount of regenerative braking as the coordinated control method for the regenerative braking of an environment friendly vehicle according to the present disclosure.

In general, the possible amount of regenerative braking is determined based on the condition of the motor and the battery, and accordingly, logic for determining the possible amount of regenerative braking based on the condition of the battery and the motor is necessary. To this end, referring to the control flow diagram of accompanying FIG. 5, the MCU estimates an electrically chargeable motor power for the battery in consideration of the chargeable battery power provided from the BMS which is the battery controller, elements acting as loads to the battery such as an electric field load, a starting generator, and FATC, etc., a motor speed, and a motor chargeable torque, and the HCU determines a mechanically chargeable motor power by comparing with the chargeable motor power received from the MCU.

In addition, since the HCU transfers a brake force to wheels at the time of regenerative braking, the HCU performs an operation of a mechanically regenerative torque by using a vehicle speed component to judge a behavior of the wheels, and performs an operation of a possible amount of regenerative braking transferred to the wheels through the transmission. In other words, the operation of the possible amount of regenerative braking is performed, through a procedure of estimating the chargeable motor power for the battery by using as input elements the chargeable battery power, the battery load, the motor speed, and the motor chargeable torque provided from the BMS which is the battery controller, a procedure of operating the regenerative torque by using the vehicle speed component, and a procedure of multiplying the regenerative torque by a transmission gear ratio. As such, the operation of the possible amount of regenerative braking becomes possible, so that the early stage control of the regenerative braking is possible.

Conventionally, a hydraulic pressure of about 2 bar is unconditionally first applied at the initial stage of braking, and then, the regenerative braking is performed. This is because the estimation of how much the regenerative braking is possible is impossible; however, in the present disclosure, since the estimation of the possible amount of regenerative braking is possible, it is possible to minimize the initial stage amount of hydraulic braking. Also, since the early stage control of the regenerative braking is possible, it is possible to maximize the amount of regenerative braking.

Meanwhile, an additional operation for operating the possible amount of regenerative braking practically transferred to the wheels when the regenerative braking is limited or at the time of speed change is explained below.

First, it is determined whether the regenerative braking is limited. Whether or not the regenerative braking is limited is determined in order to increase the reliability of the possible amount of regenerative braking. In the case where the regenerative braking is presently limited, there exist limitations according to, for example: the state of a speed change lever, such as a sports mode, an N-step, a P-step, or an R-step of the transmission; types of speed change where regenerative braking is impossible in a transmission mechanism, such as a lift-foot-up (LFU) state or a speed change immediately before stopping; and a changing speed change pattern when the vehicle is climbing (e.g., driving on a road with a steep gradient).

When encountering this regenerative braking limitation condition, the HCU outputs the possible amount of regenerative braking as 0. As a reference, the LFU state refers to a speed change method in which when the driver lifts foot up from an acceleration pedal for speed reduction during travel, the speed change is made from the speed change step under travel to a speed change step one step higher, so that a phenomenon in which a shock is generated to the vehicle due to the vehicle speed change according to an abrupt fall of an engine revolutions.

Second, the amount of regenerative braking transferred to the wheels during the speed change is determined. When estimating the possible amount of regenerative braking during the speed change, the determination as to how much the actual amount of regenerative braking is transferred to the wheels during the speed change is not easy. Therefore, during the speed change, since the regenerative braking is not performed so that an energy recovery by means of the regenerative braking is limited, an aggravation of the fuel ratio is inevitable, whereby the estimation of the possible amount of regenerative braking is difficult so that an introduction of early stage control logic of regenerative braking itself may be impossible. However, in the present disclosure, the possible amount of regenerative braking may be calculated by determining whether a condition of the motor corresponds to a steady torque mode, a steady power mode, a mode conversion, etc., so that the early stage control of regenerative braking is possible even during the speed change.

Here, a method of calculating the possible amount of regenerative braking during the speed change is explained below.

Steady Torque Mode

Figure 6:
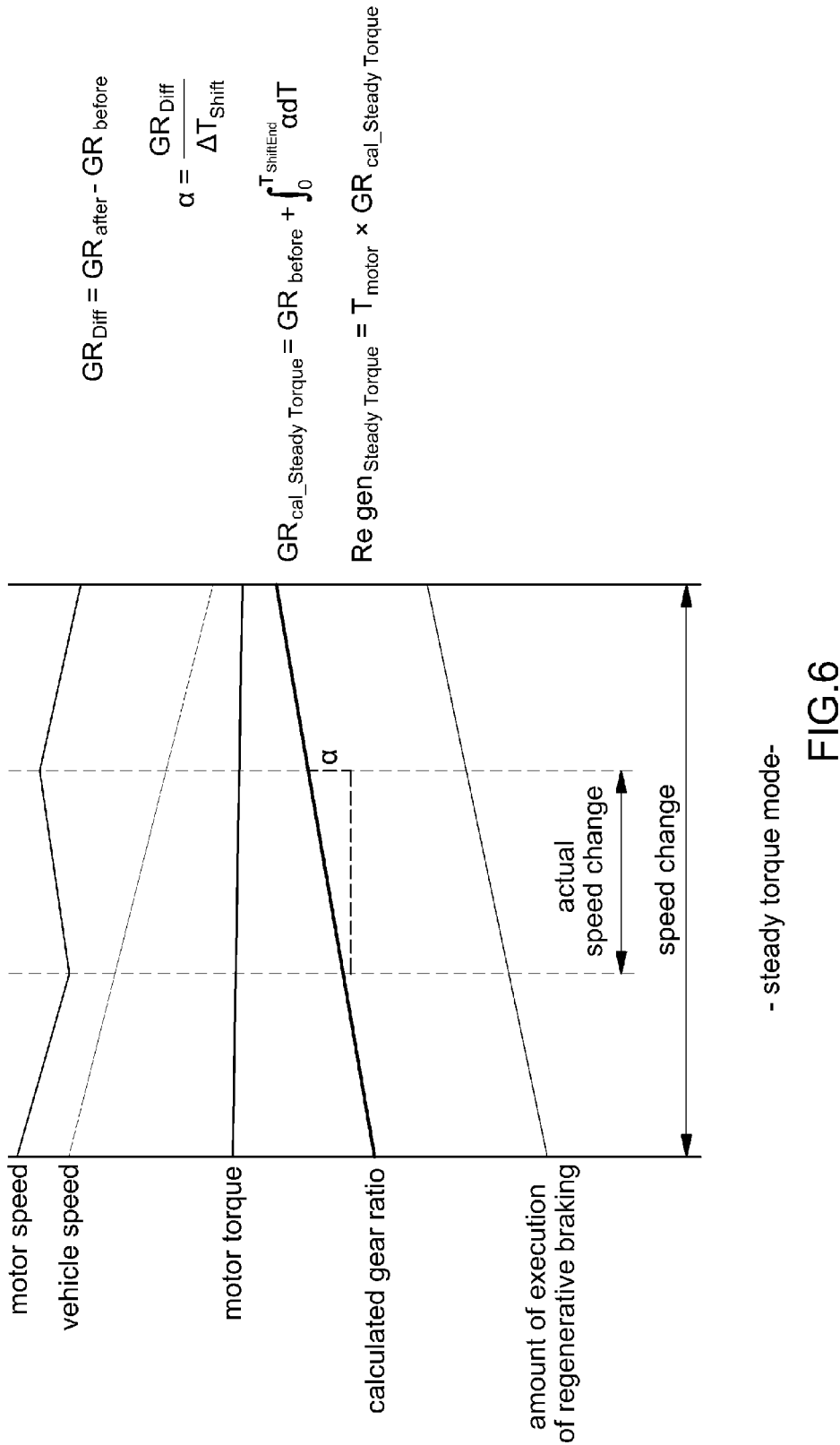
FIGS. 6 to 8 are graphs showing a procedure of operating an possible amount of regenerative braking during a speed change as the coordinated control method for the regenerative braking of an environment friendly vehicle according to the present disclosure.

FIG. 6 illustrates a graph showing a procedure of operating the possible amount of regenerative braking during the speed change in the steady torque mode condition of the motor.

The steady torque mode is a mode in which the motor torque is in a steady torque region before and after the speed change, and in general uses a region at or below a base rpm of the motor. The possible amount of regenerative braking is basically calculated by multiplying the motor torque by the gear ratio, and during the speed change calculated by multiplying the motor torque $T_{MOTOR}$ by a calculated gear ratio $GR_{cal\text{-}SteadyTorque}$. For this, first, a gear ratio difference $GR_{Diff}$ between a before speed change step gear ratio $GR_{before}$ and an after speed change step gear ratio $GR_{after}$ is calculated using Formula 1 shown below:

$$GR_{Diff}=GR_{after}-GR_{before} \quad \text{Formula 1}$$

In addition, an increase-decrease gradient of the gear ratio difference, that is, a value $\alpha$, obtained by dividing the gear ratio difference $GR_{Diff}$ by a speed change time $\Delta T_{Shift}$ is calculated using Formula 2 shown below:

$$\alpha = \frac{GR_{Diff}}{\Delta T_{Shift}} \quad \text{Formula 2}$$

The calculated gear ratio $GR_{cal\text{-}SteadyTorque}$ may be calculated by adding a value obtained by integrating the value $\alpha$ in time to the step gear ratio $GR_{before}$ before the speed change, as shown in Formula 3 shown below:

$$GR_{cal\text{-}SteadyTorque}=GR_{before}+\int_0^{TShiftend}\alpha dT \quad \text{Formula 3}$$

Therefore, the possible amount of regenerative braking $Regen_{steadyTorque}$ during the speed change in the steady torque mode condition of the motor is calculated by multiplying the motor torque $T_{MOTOR}$ by the calculated gear ratio $GR_{cal\text{-}SteadyTorque}$, as in Formula 4 shown below:

$$Regen_{steadyTorque}=T_{motor}\times GR_{cal\text{-}SteadyTorque} \quad \text{Formula 4}$$

Steady Power Mode

Figure 7:
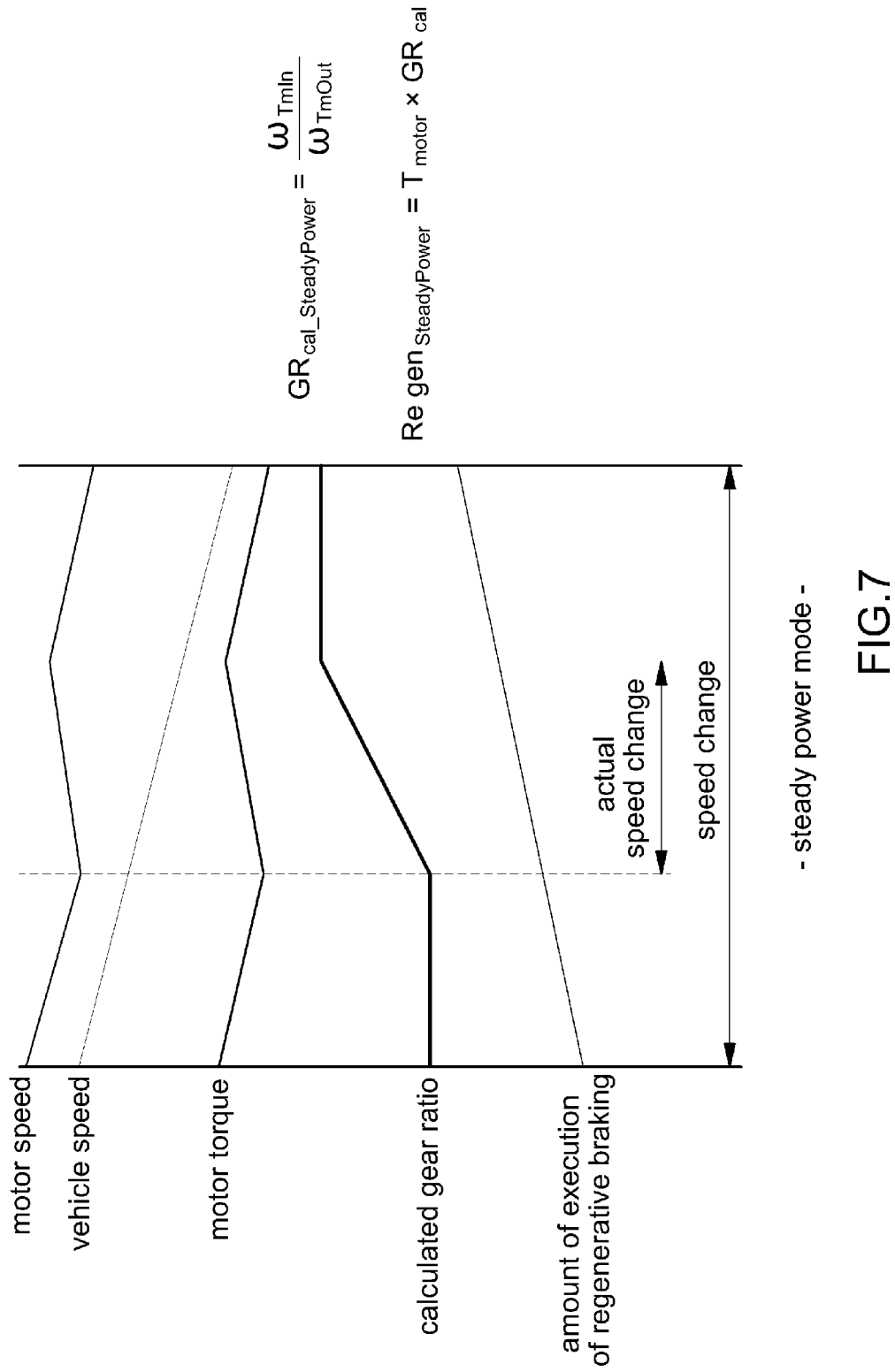

FIG. 7 illustrates a graph showing a procedure of operating the possible amount of regenerative braking during the speed change in the steady power mode condition of the motor.

The steady power mode is a mode in which the motor torque is in a steady power region before and after the speed change, and in general, uses a region at or above the base rpm of the motor. The possible amount of regenerative braking during the speed change in the steady power mode condition of the motor may also be obtained through Formula 4 shown above; however, the calculated gear ratio $GR_{cal\text{-}SteadyTorque}$ is obtained by dividing a transmission input shaft speed $\omega_{Tmin}$ by a transmission output shaft speed $\omega_{TmOut}$, as in Formula 5 shown below:

$$GR_{cal\_SteadyPower} = \frac{\omega_{TmIn}}{\omega_{TmOut}} \qquad \text{Formula 5}$$

Mode Conversion

Figure 8:
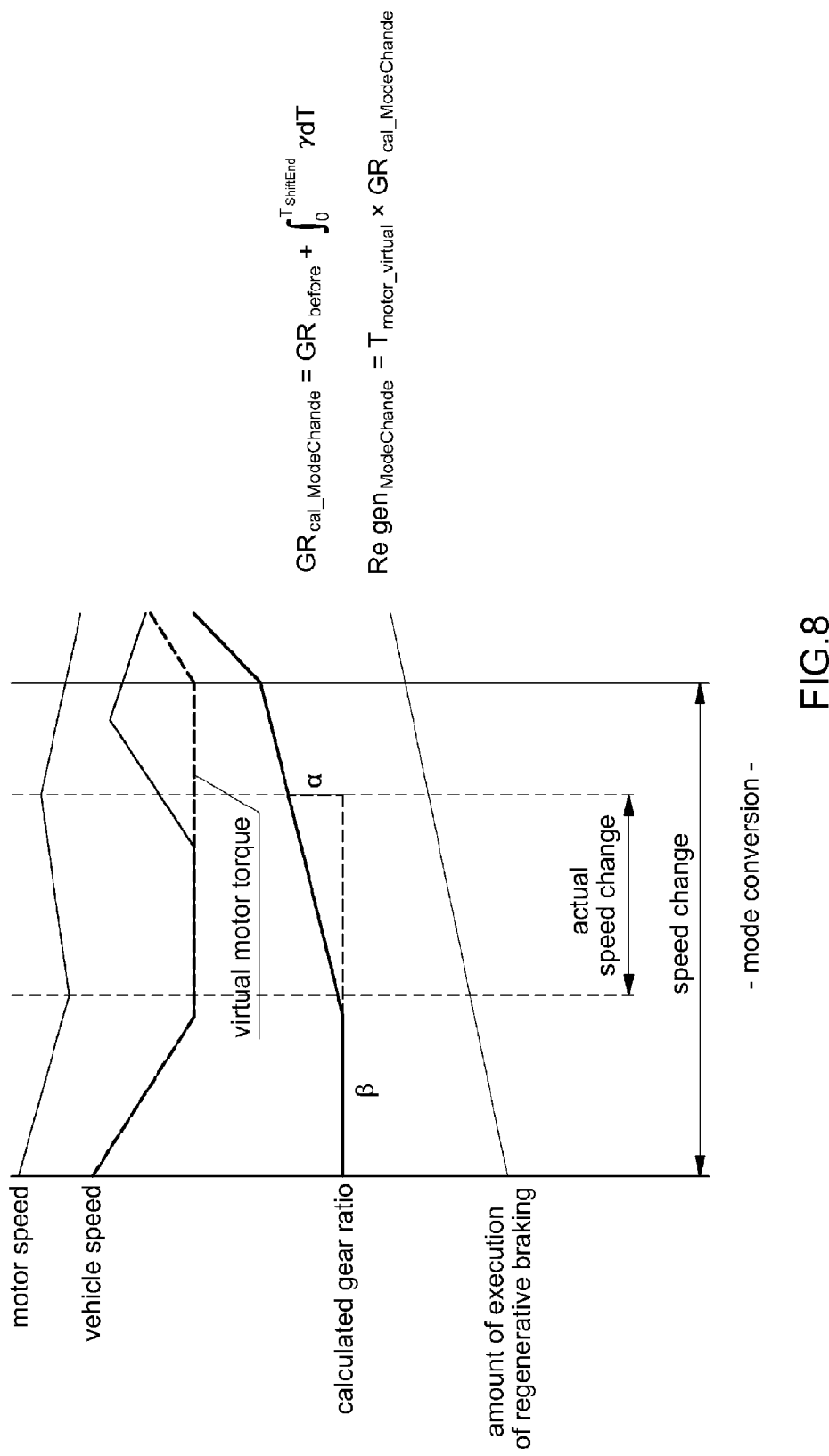

FIG. 8 illustrates a graph showing a procedure of operating the possible amount of regenerative braking during the speed change in the mode conversion condition of the motor.

The mode conversion is a mode in which the motor torque comes into and out from the steady torque region and the steady power region during the speed change, and in general is a case where the motor speed passes the base rpm of the motor during the speed change. At the time of the mode conversion, since the motor torque comes into and out from the steady torque region and the steady power region during the speed change, there is a difficulty in calculating the possible amount of regenerative braking. To overcome the difficulty, a virtual motor torque is determined in which an interval where the motor torque abruptly increases at the time of the mode conversion during the speed change is arbitrarily removed. Therefore, a calculated gear ratio $GR_{cal\text{-}ModeChange}$ is obtained using Formula 6 shown below:

$$GR_{cal\text{-}ModeChange} = GR_{before} + \int_0^{TShiftend} \gamma \, dT \qquad \text{Formula 6}$$

Then, the possible amount of regenerative braking at the time of the mode conversion is calculated using Formula 7 shown below:

$$\text{Regen}_{modeChange} = T_{motor\_virtual} \times GR_{cal\text{-}ModeChange} \qquad \text{Formula 7}$$

The calculated gear ratio $GR_{cal\text{-}ModeChange}$ is obtained by integrating, at a time of the speed change, a gradient γ obtained by adding the increase-decrease gradient α of the gear ratio in the steady torque region to an increase-decrease gradient β of the gear ratio in the steady power region, and by adding the before speed change step gear ratio $GR_{before}$ to the gradient γ. Therefore, the possible amount of regenerative braking $\text{Regen}_{MotorChange}$ at the time of the mode conversion is calculated by adding the calculated gear ratio $GR_{cal\text{-}ModeChange}$ to the virtual motor torque $T_{motor\text{-}virtual}$, as seen in Formula 7 above.

As described above, the possible amount of regenerative braking may be calculated by evaluating a condition of the motor and determining whether the condition corresponds to the steady torque mode, the steady power mode, or the mode conversion, so that the early stage control of the regenerative braking is possible even during the speed change.

Figure 9:
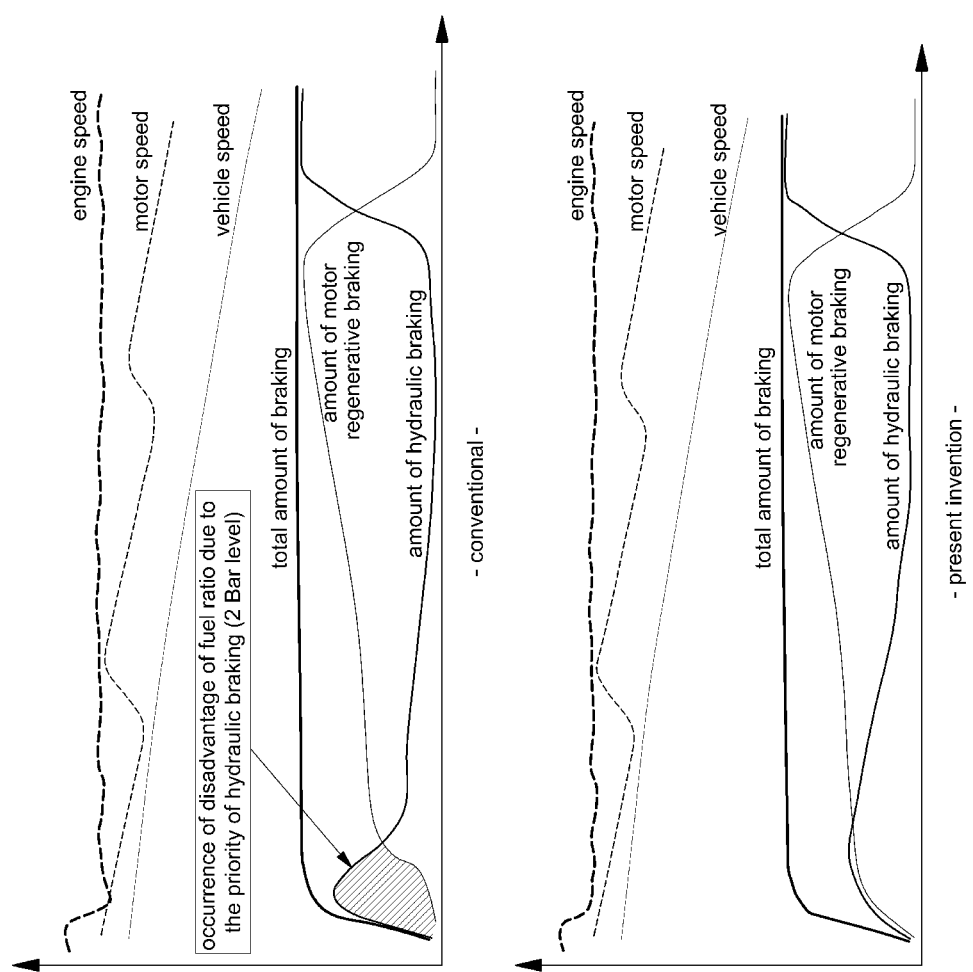
FIG. 9 is a graph showing a comparison of a fuel ratio improvement effect according to the coordinated control method for the regenerative braking of the present disclosure with a fuel ratio according to existing conventional method.

As shown in FIG. 9, conventional methods suffered from a disadvantage concerning the fuel ratio due to a priority of the hydraulic braking at the early stage of braking. However, in the present disclosure, energy recovery increase and fuel ratio improvement may be achieved through the maximization of the amount of regenerative braking by making the regenerative braking be first performed prior to the hydraulic braking based on the early stage control of regenerative braking at the early stage of braking.

Through the above described problem solving means, the present disclosure provides the following effects. First, energy recovery increase and fuel ratio improvement may be achieved by making the regenerative braking be first performed prior to the hydraulic braking at the early stage of braking of an environmentally friendly vehicle. Second, due to the early stage control of regenerative braking at the time of braking, a speed reduction linearity at the early stage of braking may be improved, and accordingly, a feeling of discomfort due to suddenness may be prevented at the early stage of braking.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A method for determining an amount of regenerative braking comprising:
   determining a possible amount of regenerative braking at a time of braking a vehicle;
   distributing a first amount of regenerative braking up to the possible amount of regenerative braking as the amount of regenerative braking;
   distributing a second amount of regenerative braking remaining from the possible amount of regenerative braking as an amount of hydraulic braking; and
   performing, first, regenerative braking by issuing a motor torque instruction according to the possible amount of regenerative braking and, second, friction braking using the amount of hydraulic braking.

2. The method of claim 1, wherein the determining of the possible amount of regenerative braking comprises:
   calculating a chargeable motor power for a battery based on one or more of: a chargeable battery power, a battery load, a motor speed, and a motor chargeable torque, provided from a battery controller;
   operating the regenerative braking based on a vehicle speed; and
   multiplying the regenerative braking by a transmission gear ratio.

3. The method of claim 1, wherein the possible amount of regenerative braking is determined to be zero when encountering a regenerative braking limitation.

4. The method of claim 3, wherein the regenerative braking limitation includes one or more of: a speed change lever being set to a sports mode, an N-step, a P-step, or an R-step, a lift-foot-up (LFU) state or a speed change occurring immediately before stopping, and a speed change pattern being changed when the vehicle is climbing.

5. The method of claim 1, further comprising:
   when determining the possible amount of regenerative braking during a speed change, determining whether a condition of a motor of the vehicle corresponds to a steady torque mode, a steady power mode, or a mode conversion during the speed change.

6. The method of claim 5, wherein the possible amount of regenerative braking ($\text{Regen}_{SteadyTorque}$) during the speed change in the steady torque mode condition of the motor is determined by: i) obtaining a value α by dividing a gear ratio difference ($GR_{Diff}$) before and after the speed change by a speed change time ($\Delta T_{shift}$), ii) obtaining a calculated gear ratio ($GR_{cal\text{-}SteadyTorque}$) by adding a value obtained by integrating the value α in time and a before speed change step gear ratio ($GR_{before}$), and iii) multiplying the calculated gear ratio ($GR_{cal\text{-}SteadyTorque}$) by a motor torque ($T_{MOTOR}$).

7. The method of claim 5, wherein the possible amount of regenerative braking ($\text{Regen}_{SteadyPower}$) during the speed change in the steady power mode condition of the motor is determined by: i) obtaining a calculated gear ratio ($GR_{cal\text{-}SteadyTorque}$) by dividing a transmission input shaft speed ($\omega_{Tmin}$) by a transmission output shaft speed ($\omega_{TmOut}$), and ii) multiplying the calculated gear ratio ($GR_{cal\text{-}SteadyTorque}$) by a motor torque ($T_{MOTOR}$).

8. The method of claim 5, wherein the possible amount of regenerative braking ($\text{Regen}_{MotorChange}$) during the speed change in the mode conversion of the motor is determined by: i) obtaining the calculated gear ratio ($GR_{cal\text{-}ModeChange}$) by integrating, at a time of the speed change, a gradient ($\gamma$) obtained by adding the increase-decrease gradient $\alpha$ of the gear ratio in a steady torque region of the motor and an increase-decrease gradient $\beta$ of the gear ratio in a steady power region of the motor, ii) adding a virtual motor torque ($T_{motor\text{-}virtual}$) to the calculated gear ratio ($GR_{cal\text{-}ModeChange}$), and iii) adding a step gear ratio ($GR_{before}$) before the speed change to the gradient ($\gamma$).

* * * * *